Aug. 15, 1939.  R. J. IFIELD  2,169,645
AUTOMATICALLY REVERSIBLE FREEWHEEL OR ONE-WAY LOCKING DEVICE
Filed Sept. 22, 1938  3 Sheets-Sheet 1

Inventor
Richard J. Ifield
by Mawhinney & Mawhinney
Attorneys.

Aug. 15, 1939.   R. J. IFIELD   2,169,645
AUTOMATICALLY REVERSIBLE FREEWHEEL OR ONE-WAY LOCKING DEVICE
Filed Sept. 22, 1938    3 Sheets-Sheet 3

Inventor
Richard J. Ifield
by Mawhinney & Mawhinney
Attorneys.

Patented Aug. 15, 1939

2,169,645

UNITED STATES PATENT OFFICE 2,169,645

AUTOMATICALLY REVERSIBLE FREEWHEEL OR ONE-WAY LOCKING DEVICE

Richard Joseph Ifield, Solihull, Birmingham, England

Application September 22, 1938, Serial No. 231,253
In Great Britain January 22, 1937

6 Claims. (Cl. 74—315)

This invention relates mainly to a reversible one-way locking device for rotary motion, of the kind incorporating a jamming member such as a ball or roller (preferably a set thereof) disposed between and coacting with two main surfaces one of which is of double-inclined form, the other being cylindrical in the case of a radial form of the device or flat in the case of an axial form of the device.

My main object is to provide a device of this kind by which a change of directional operation may be automatically effected in predetermined conditions.

The device in question is for use with a restricted differential mechanism. This may be of the kind described in British patent specification No. 471,325 or No. 497,028.

According to the invention, resilient means bias the double-inclined surface relatively to the other surface and to the jamming member so that the latter will coact with one of the inclined portions to give locking between the surfaces only in one direction as long as the driving element of the restricted differential mechanism is being driven in one direction, the parts being arranged to allow of relative movement, against the bias, between the surfaces when the torque value exceeds a predetermined amount as occurs when the said driving element is driven in the other direction to cause the jamming member to coact with the other of the inclined portions, the resilient means then biassing the double-inclined surface relatively to the other surface and to the jamming member so that the latter will coact with the said other inclined portion to give locking between the surfaces only in the other direction as long as the said driving element is driven in the said other direction.

Figure 1:
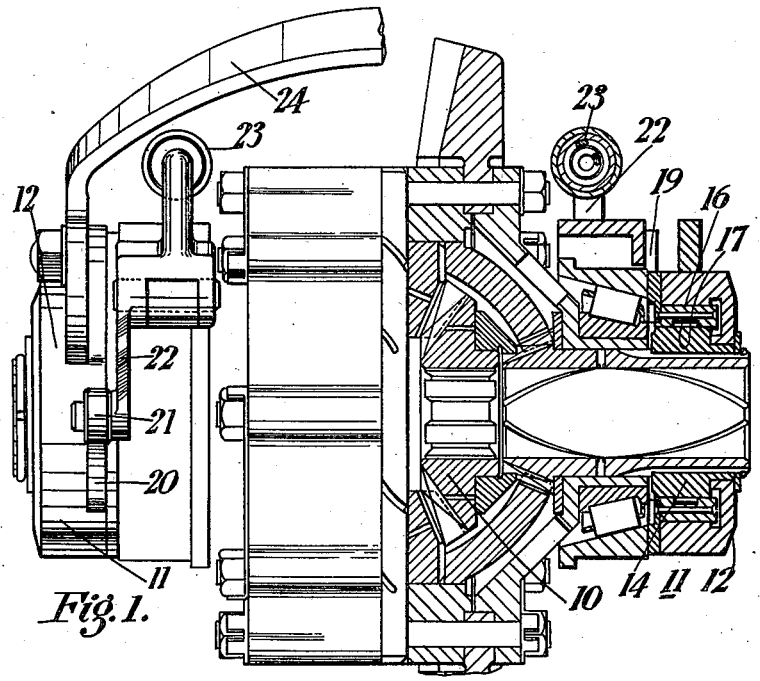
Figure 1 is a part-sectional elevation of a restricted differential gearing with the two one-way locking devices, of the radial kind, interconnected and arranged for operation according to the invention, the section being taken mainly on the line I—I of Figure 2.

The same reference characters are applied to similar parts throughout the drawings as far as possible, the differential gearing being designated generally by the numeral 10.

Figure 2:
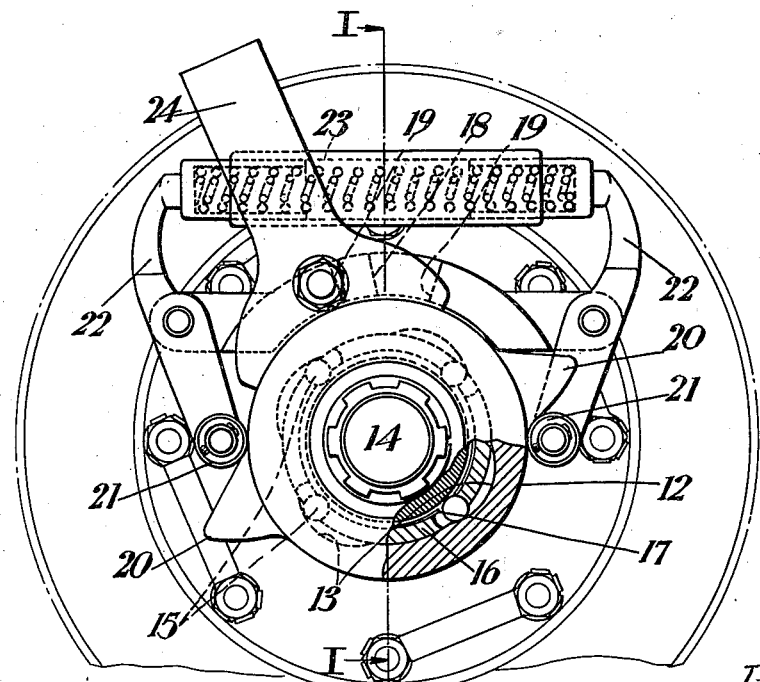
Figure 2 is mainly an end elevation thereof.

In Figures 1 and 2, where the one-way locking devices 11 (only one being shown in section) act as brakes in the reverse direction only when the motor-vehicle is being driven forwardly, and only in the forward direction when the motor-vehicle is being driven in reverse gear, each device 11 includes an annulus which is the held member 12 and the inner periphery of which has formed on it a plurality of double-inclined surfaces each of which is preferably formed as an arc 13 of a circle. The inner member, the one 14 which is to be allowed to free-wheel, has a cylindrical surface. Obviously the inner member could be the held member 12, in which case it would carry the double-inclined surfaces, the annulus then being the free-wheeling member 14 and having a cylindrical surface. A jamming member in the form of a roller 15 is arranged to co-act with the surface of the inner member and one or other of the inclined portions of each double-inclined surface, according to the direction of the drive. The rollers 15 are carried by a cage 16 which receives them with clearance, and they are located substantially centrally of the clearance openings by leaf or other springs 17 riveted or otherwise secured to the cage. The cage is formed with a radially-extending or other projecting peg 18 which co-operates with a slot 19 in a stationary member to allow the cage a limited rotational movement.

The held member 12 is formed with a pair of diametrically-opposite cams or V-teeth 20 (here shown as extending radially outwardly) co-acting with which are antifriction means 21 carried by a pair of levers 22 the other ends of which are engaged by a common compression spring 23. The disposition is such that the common spring acting through the levers and V-teeth biasses the held member 12 against turning when locking is required.

Thus, when the rollers are in the position shown in Figure 2 (i. e., the cage rotated clockwise relative to the held member 12 and with the projection 18 to the left-hand end of the slot 19) the free-wheeling member 14 may revolve freely in the anti-clockwise direction but will lock in the clockwise direction, tending to compress the spring 23 through the antifriction means 21 rising up the adjacent faces of the V-teeth 20. In this way free-wheeling is allowed for in the driven direction, but, the reaction through the differential gearing 10 being very low, a sufficiently high braking effort is provided in the reverse direction to prevent excessive differential action.

When the vehicle begins to be driven in the reverse direction the high torque applied to the held members 12 causes a partial rotation of the latter whilst the antifriction means 21 ride up the faces of the V-teeth 20 against the increasing spring pressure. On reaching the apices of the teeth the antifriction means pass to the remote faces thereof and thus complete the partial rotation of the held member 12. After this rotational movement has been completed the projecting peg 18 lies in the other extreme position and the rollers co-act with the other inclined portions, thus reversing the action of the one-way locking device.

It should be understood that instead of the one-way locking device having spring means for centralising the rollers, the cage may be formed with slots for the rollers, the cage itself being fixed and the rollers partaking of movement from end-to-end of the slots each time the direction in which the vehicle is being driven is reversed.

In the construction of Figures 1 and 2 the two one-way locking devices 11, 11 are remote from one another but they are shown as having the held members 12, 12 rigidly interconnected by a yoke 24 for movement in unison. Consequently, when driving in one particular direction, whichever of the locking devices is acting for locking purposes the associated held member 12 is biassed against movement by the joint action of both the compression springs 23.

Figure 3:
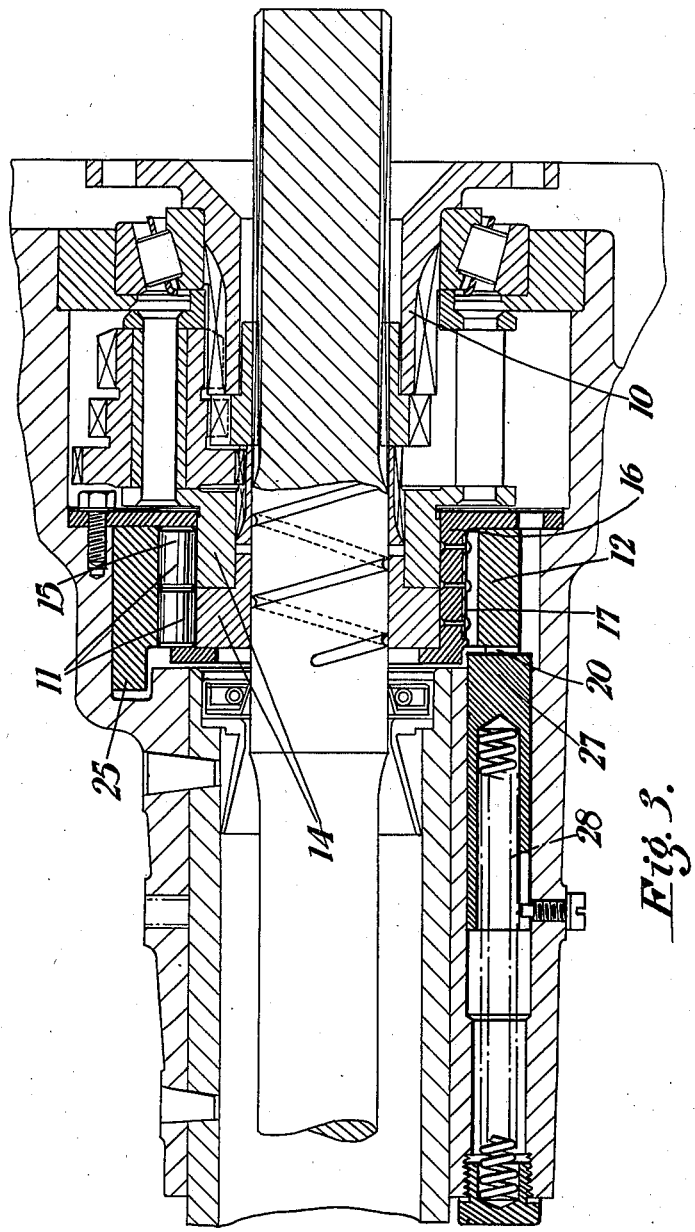
Figure 3 is a sectional elevation of a restricted differential gearing showing an alternative arrangement of one-way locking devices according to the invention.

In the modification shown by Figure 3, the two one-way locking devices 11, 11 incorporate a common held member 12 which coacts with both the free-wheeling members 14. The held member 12 is formed with a flange 25 into which is cut an axially-extending V-tooth 20 engaged by a V-ended detent 27 spring pressed at 28, the detent and V-tooth serving, as will be well understood, the purpose of the V-tooth, antifriction roller 21, lever 22 and compression spring 23 of Figures 1 and 2. Obviously, for preference, two or more of such detents and V-teeth will be symmetrically arranged round the main axis of the gearing.

In the case where the cage is adapted for movement (as described in connection with Figures 1 and 2), if one assumes that the cage movement required to reverse the direction of action is ten degrees relatively to the held member 12, the V-teeth 20 should give a total throw of, say, twenty-five degrees and the cage should be allowed a free movement of, say, fifteen degrees. Consequently, when the direction of action is being changed the antifriction means 21 of Figures 1 and 2, or the detent of Figure 3, will have passed approximately two-and-a-half degrees beyond the apices of the V-teeth when the cage reaches the limit of its movement, leaving a further ten degrees of movement of the held member 12 to complete the reversing of the direction of action.

Figure 4:
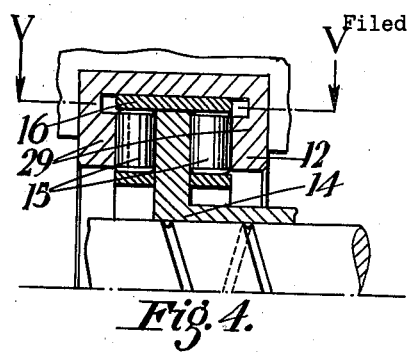
Figure 4 is a fragmentary sectional view of an axial kind of one-way locking device to which the invention can be applied, Figure 5 being a cross-section taken more or less on the line V—V of Figure 4.
Figure 5:
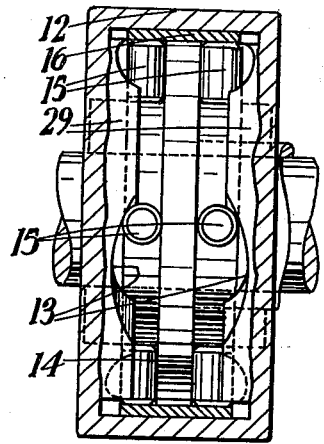

In the construction of Figures 4 and 5 the free-wheeling member 14 is shown as being in the form of a disc with rollers 15 engaging the opposite faces thereof, and the double-inclined surfaces for each roller are in this case formed in the adjacent radial faces of the inwardly-extending flanges 29 of the held member 12. The latter has a radially-arranged or an axially-arranged V-tooth in the manner of the constructions of Figures 1 to 3.

Figure 6:
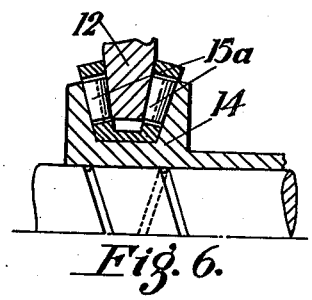
Figure 6 is a fragmentary sectional view indicating how tapered rollers may be used as jamming members.

It will be evident, too, as shown by Figure 6, that use may be made of tapered rollers 15a as the jamming members. The outer ring is again marked 12 to indicate that it is the held member having the double-inclined surfaces, the inner member being marked 14 to show that it is the free-wheeling member.

Figure 7:
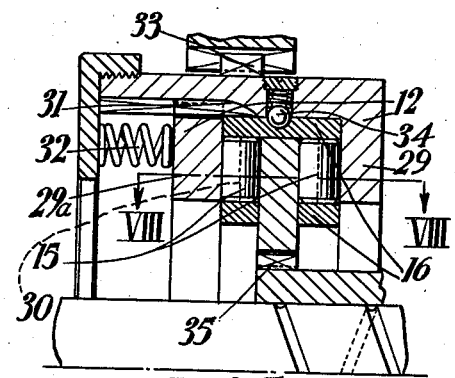
Figure 7 is a fragmentary sectional view of another form of axial one-way locking device, Figure 8 being a fragmentary cross-section taken on the line VIII—VIII of Figure 7.
Figure 8:
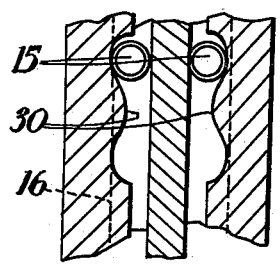

An alternative form of axial one-way locking device is shown by Figures 7 and 8 where the double-inclined surfaces are adjacent one another, being shown as an abutting portion 30. In this case the necessary angular movement between the held member 12 and the cage 16 to reverse the direction of action of the one-way locking device can only be effected by the axial separation of the plates of which the held member is composed. Thus, the drawing shows the held member as including an axially-movable flange 29a having a splined connection at 31 with the remainder of the held member and spring means 32 biasing the flanges 29, 29a towards one another. Appropriate stops (not shown) are provided for preventing the spring means 32 from exerting any pressure on the rollers except when locking occurs. In this case the held member 12 is fixedly held against rotational movement, as by means of the tooth 33, and the cage 16 is engaged in its two extreme positions by a spring-pressed ball 34 which is carried by the held member and serves for lightly biassing the rollers against the appropriate jamming surfaces.

Obviously, if desired, the main portion of the held member may be located against axial movement, the disc part of the free-wheeling member 14 having a splined connection 35 with the main portion thereof.

Figure 9:
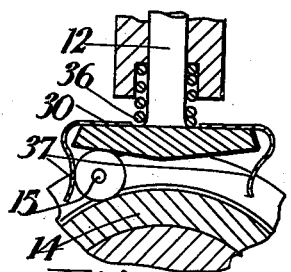
Figure 9 is a fragmentary axial view of another form of radial one-way locking device.

A further form of radial one-way locking device is shown by Figure 9, in which each of a number of held members 12 (one only being shown) is mounted for sliding movement in a radial direction against a compression spring 36 when the reaction torque is sufficient to reverse the direction of operation of the one-way locking device. In this case also a stop prevents the spring from exerting any pressure on the rollers except when locking occurs. The double-inclined surfaces are formed on the abutting portion 30, rather as in the construction of Figures 7 and 8. 37 are leaf springs for lightly biasing the rollers in the jamming direction. With the rollers 15 in the positions shown the free-wheeling member 14 can turn freely in an anti-clockwise direction but will lock against the pressure of the springs 36 in a clockwise direction.

Not only can automatic reversing be obtained with the mechanism of the invention when the reaction torque exceeds a predetermined value, but when applied to a restricted differential gearing as described in connection with the drawings it will additionally serve for preventing overstressing of the axle shafts or other parts of the gearing; inasmuch as if the torque reaction should be excessive the held members 12 will move to-and-fro whilst the springs 23, 28, 32 or 36, as the case may be, absorb the shock loads.

What I claim as my invention and desire to secure by Letters Patent of the United States is:

1. A restricted differential mechanism having a driving element and a reversible one-way locking device through which restriction is obtained, said device including relatively-movable members one having a surface of double-inclined form the other having a uniform surface, a jamming member disposed between and coacting with said surfaces, a V-tooth carried by one of said members, and a spring coacting with said V-tooth such that for one direction of rotation of said driving element when said spring is coacting with one flank of said V-tooth said spring will bias the member carrying said V-tooth in a direction in which said jamming member will coact with one of the inclined portions of said double-inclined surface, giving locking between said members against rotation in the reverse direction with respect to the direction of rotation of the driving element, whilst when the driving element is rotated in the opposite direction, the member carrying said V-tooth will move against said spring bias until said spring coacts with the other flank of said V-tooth, whereby the jamming element then coacts with the other inclined portion of said double-inclined surface to give locking between said members against rotation in the reverse direction with respect to the direction of rotation of the driving element.

2. A restricted differential mechanism having a driving element and a reversible one-way locking device through which restriction is obtained, said device including a member having a surface of double-inclined form, said member mounted for angular movement between limits, a rotatable member having a uniform surface, a jamming member disposed between and coacting with said surfaces, a V-tooth formed on said first-mentioned member, and a spring coacting with said V-tooth such as to bias said first-mentioned member to one or another of its extreme angular positions; the arrangement being such that in one extreme angular position said jamming member will coact with one of the inclined portions of said double-inclined surface, giving locking between the members only in one direction as long as the driving element is rotated in one direction, and such that when the driving element is rotated in the reverse direction said first-mentioned member will move against the spring bias to its other extreme angular position in which said jamming member then coacts with the other inclined portion of said double-inclined surface to give locking between said members only in the other direction as long as the driving element is rotated in the said reverse direction.

3. A restricted differential mechanism having a driving element and a reversible one-way locking device through which restriction is obtained, said device including a stationary part, an annulus having internally a portion of its surface of double-inclined form, said annulus mounted in said stationary part for angular movement between limits, a cylindrical rotatable member disposed with annular clearance in said annulus, a jamming member disposed in said annular clearance and coacting with the surface of said cylindrical member and with said double-inclined surface, a V-tooth carried by said annulus, and a spring coacting with said V-tooth to bias said annulus to one or another of its extreme angular positions; the arrangement being such that in one extreme angular position said jamming member will coact with one of the inclined portions of said double-inclined surface, allowing rotation of said cylindrical member only in one direction as long as the driving element is rotating in one direction, and such that when the driving element is rotated in the other direction said annulus will move against the spring bias to its other extreme angular position in which said jamming member then coacts with the other inclined portion of said double-inclined surface to allow rotation of said cylindrical member only in the other direction as long as the driving element is rotating in said other direction.

4. A restricted differential mechanism having a driving element and a pair of reversible one-way locking devices through which restriction is obtained, each of said devices including a member having a surface of double-inclined form, a second member having a uniform surface, a jamming member disposed between and coacting with said surfaces, one of said members mounted for rotation and the other member mounted for angular movement between limits, and resilient means adapted to bias said parts whereby said jamming member will coact with one or other of the inclined portions of said double-inclined surface; such that when said jamming member coacts with one of the inclined portions locking between the members is obtained only in one direction and only as long as the driving element is rotated in one direction, and such that when the driving element is rotated in the other direction said jamming member will coact with the other inclined portion of said double-inclined surface to give locking between said members only in the other direction and only as long as the driving element is rotated in said other direction, said other members of each of said devices being interconnected for movement in unison.

5. A restricted differential mechanism having an input element, a pair of output elements and associated with each of the latter a one-way locking device through which the restriction is obtained, one member of each locking device being relatively movable angularly between limits to allow of the input element being driven in either direction, resilient means acting to bias said one member to one or other of its extreme angular positions, and means interconnecting said one members of the two devices for movement in unison, whereby said one-way locking devices for reaction purposes will carry a predetermined torque value in one direction when said one members are in one extreme position and the input element is driven in one direction but will automatically reverse when the input element is driven in the other direction and will then carry a predetermined torque value in the other direction for reaction purposes when said one members are in the other extreme position, automatically reversing to the first direction when the input element is again driven in the first direction.

6. A restricted differential mechanism having a driving element and incorporating a one-way locking device through which the restriction is obtained, said device including a rotatable member with a uniform surface, a member having a double-inclined surface, a jamming roller interposed between said members, and resilient means biasing said members so that said jamming roller is engaged with one or other of the inclined portions of said double-inclined surface and can only move from one inclined portion to the other by further stressing the spring of said resilient means; whereby said one-way locking device for reaction purposes will carry a predetermined torque value in one direction while the driving element is rotated in one direction but will automatically reverse when the driving element is rotated in the other direction and will then carry a predetermined torque value in the other direction for reaction purposes, automatically reversing to the first direction when the driving element is again rotated in the first direction.

RICHARD JOSEPH IFIELD.